April 19, 1966            R. CARLIN            3,246,702

DRAFT SENSING DEVICE FOR TRACTOR HYDRAULIC SYSTEM

Filed Dec. 6, 1961            2 Sheets-Sheet 1

Inventor
Robert Carlin
By Fabian A. Bwork
Attorney

April 19, 1966 R. CARLIN 3,246,702
DRAFT SENSING DEVICE FOR TRACTOR HYDRAULIC SYSTEM
Filed Dec. 6, 1961 2 Sheets-Sheet 2

Inventor
Robert Carlin
By Fabian A Bruck
Attorney

United States Patent Office 3,246,702
Patented Apr. 19, 1966

3,246,702
DRAFT SENSING DEVICE FOR TRACTOR HYDRAULIC SYSTEM
Robert Carlin, Milwaukee, Wis., assignor to Allis-Chalmers Manufacturing Company, Milwaukee, Wis.
Filed Dec. 6, 1961, Ser. No. 157,474
1 Claim. (Cl. 172—10)

This invention relates to a draft responsive control system for tractors. More particularly, this invention features an improved draft load sensing device for an automatic power lift and weight transfer system that varies the downward load on the tractor drive wheels.

It is well known to connect implements such as plows, harrows and the like to tractors in such a manner that variations in draft load are signaled to appropriate control means on the tractor which automatically activate power lift means to vary the implement weight transferred to the vehicle in response to changes in the draft load. Since most tractors today incorporate hydraulic power lift means, reference to the improvement will be as used with a tractor hydraulic power system, but such reference is only representative.

In a representative embodiment, a draft sensing device is used in combination with a tractor and plow, the plow being typical of an implement in which draft loads between the tractor and implement are caused to vary by such variables as soil density, wheel slippage, etc. Matching the implement weight transferred to the tractor with the draft load or draft forces has heretofore been achieved by a coiled compression spring resistance or the bending deflection of bars. A coiled spring or the deflection of a bar leaves much to be desired in the way of sensitivity and requires considerable adjusting to accommodate a wide range of draft loads.

It is therefore an object of this invention to provide a new and improved draft load sensing means utilizing a simple mounting arrangement.

It is a further object of this invention to provide a new and improved draft sensing means having a simple adjustment to prevent operation of the sensing means under light draft loads.

Another object of this invention is to provide a new and improved load sensing means having simple stop means to prevent overstress of the sensing means.

Another object of this invention is to provide a new and improved load sensing means having relatively simple construction that is more reliable and less expensive.

Other objects and advantages of the present invention will be apparent from the following description, the accompanying drawings and the appended claim.

The tractor selected to illustrate the invention includes a body 10 supporting an engine and transmission (not shown). The usual front steering wheels (not shown) and rear drive wheels 11 provide ground support for body 10.

Figure 1:
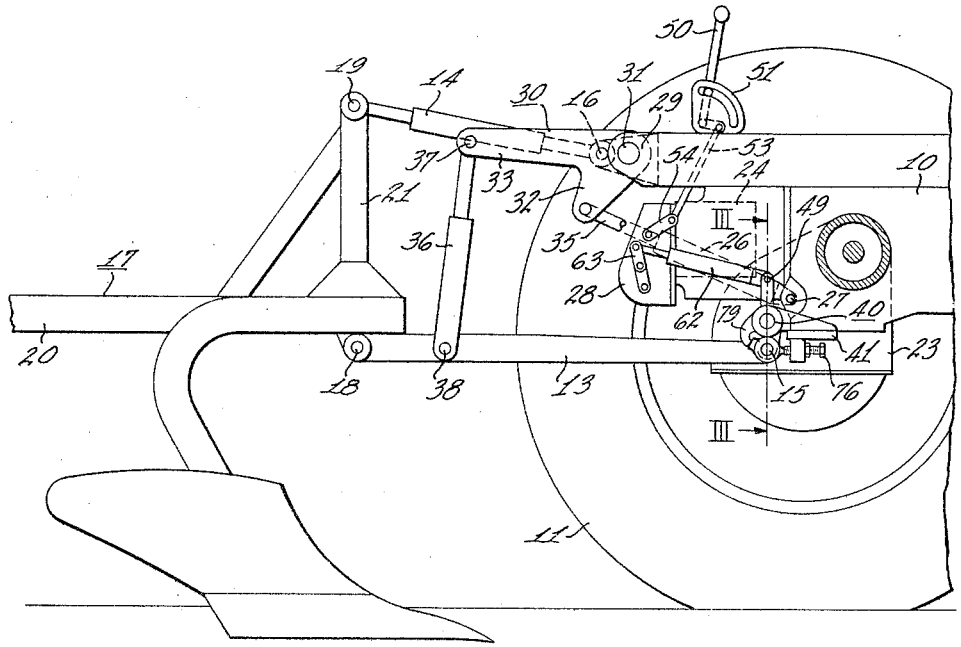
FIG. 1 is a side elevational view representing a tractor and plow.

The exemplary tractor is provided with a three point hitch, and includes a pair of lower draft links 13 and an upper or top link 14. The draft links 13, 14 are arranged in trailing relation to the tractor and to converge forwardly. The lower and upper draft links 13, 14 are pivotally connected to the tractor body at the forward ends thereof as at 15, 16 and to the implement, a plow 17 as shown in FIG. 1, at the rearward end thereof as at 18, 19 respectively. The tractor pivotal connections 15, 16 accommodate both lateral and vertical swinging of the draft links 13, 14. Suitable coupling elements (not shown) are provided at the rearward ends of the draft links 13, 14 for disengageable connection with any desired ground working or other implement to be coupled to the tractor.

The implement shown in FIG. 1 is a conventional mold board plow 17 fixed to a forwardly extending beam 20 having transverse pivotal connections 18 for receiving the lower draft links 13. A rigid mast 21 mounted on plow beam 20 includes a pivotal connection 19 at the upper end thereof to receive the rear end of top link 14.

The rear portion of the tractor body 10 is conventional; that is, in the form of a transmission and final drive casing 23 which contains drive and support means for the components to be hereinafter described. Housing means 24 are carried by the support means and house the power lift means for raising and lowering the implement.

The power lift means includes lift mechanism operatively associated with a hydraulic ram 26 pivotally mounted to tractor body 10 at 27 and connected to a suitable source of pressure fluid by conduit 25. Control means 28 are operatively associated with the source of pressure fluid for regulating the flow of pressure fluid to and from ram 26 to actuate the lift mechanism means.

The lift mechanism means includes a frame member 29 fixed to and extending rearwardly from casing 23 and a bell crank lever 30 pivotally attached to frame member 29 by pin 31 or other suitable means. Each bell crank lever 30 has one arm 32 pivotally connected with the rearwardly extending piston rod 35 of ram 26, and has its other arm 33 extending rearward and pivotally connected to a lift link 36 as by pin 37 which has its lower end pivotally connected to a lower draft member intermediate the ends thereof by pin 38 or other suitable means.

The lower draft links 13 are pivotally connected to a torsion bar device hereinafter referred to as the draft load sensing means 40. The draft load sensing means 40 being attached to and depending from tractor casing 23 completes the three point linkage. Suitable force transmitting linkage operatively connects the draft load sensing means 40 to the fluid or hydraulic control means 28 to activate and deactivate the power lift means.

Figure 3:
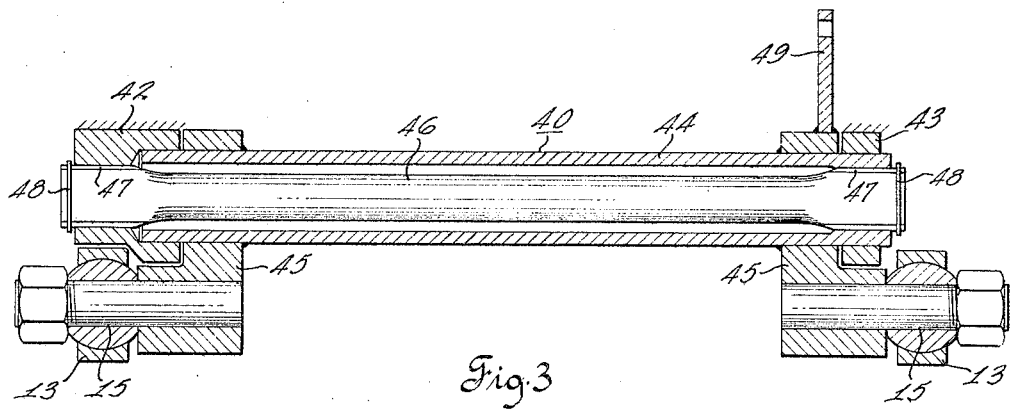
FIG. 3 is a sectional view taken along lines III—III of FIG. 1.

As shown in FIG. 3, the draft load sensing means 40, according to this invention, includes a plate 41 (FIGS. 1 and 2) suitably attached to the lower portion of casing 23 having spaced first and second supports 42, 43 mounted on plate 41 adjacent the ends thereof. A tubular member 44 having ear members 45 secured to the ends thereof as by welding, extends between and is rotatably journaled in spaced supports 42, 43. A rod 46 is disposed coaxially in tubular member 44 and extends between supports 42, 43. One end of rod 46 is secured to first support 42 as by splines 47 or other suitable means and the other end of rod 46 is secured to the tubular member 44 adjacent the second support 43 as by splines 47 or other suitable means. Snap rings 48 are disposed on the outboard ends of rod 46 to prevent separation of the assembled draft sensing device 40.

As illustrated in FIG. 1, a draft load exerted by plow 17 to ear members 45 tends to rotate tubular member 44 clockwise. Since one end of rod 46 is fixed relative to rotational movement of tubular member 44 and the other end thereof is secured to tubular member 44 for rotational movement therewith, a clockwise pull through either or both draft links 13 produces a torsional deformation in rod 46. Torsional deformation, that is, the angular windup in rod 46, is determined by the length of the bar, the section, and modulus of elasticity and results in a draft sensing displacement signal that is transmitted to the fluid control unit 28 by signal lever 49 secured to an ear member 45 as by welding.

Figure 2:
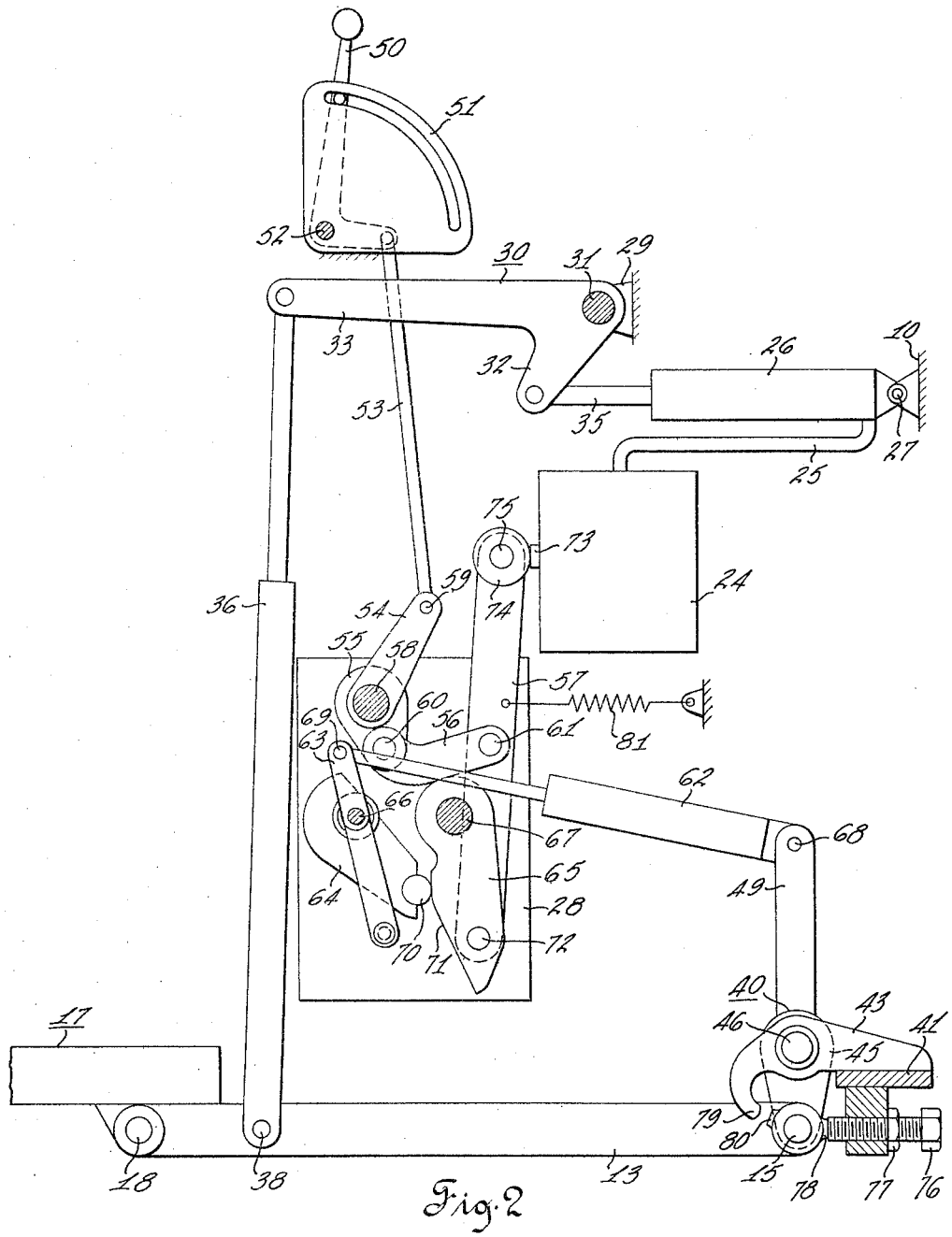
FIG. 2 is a schematic view, partly in section, of the control system for operation at one extreme condition of adjustment.

Referring to FIG. 2, it will be seen that signal lever 49 which part is movable in response to a draft load as previously explained, is associated with the fluid control unit 28 through a suitable motion transmitting linkage as will be later described.

It will also be seen in FIG. 2 that the draft load sensing range of the control means 28 is determined by the setting of a manually operable control lever 50 mounted on tractor body 10 through a suitable linkage as will be later described.

As shown in FIG. 2, the manually operable control lever 50 cooperates with a quadrant 51 mounted on tractor body 10 being pivotally connected therewith by pin 52. Lever 50 is operatively associated with control means 28 by the motion transmitting linkage which comprises a first link 53, first and second levers 54, 55, second link 56, and control engaging link 57. First and second levers 54, 55 are journaled on first shaft 58 for rotation therewith and pivotally receive first and second links 53, 56 at their radially outer ends as by pins 59, 60, respectively. Second link 56 is provided with a pin 61 remote from pivotal pin 60 for pivotal connection to control engaging link 57 intermediate the ends thereof.

The motion transmitting linkage operatively connecting signal lever 49 to control engaging link 57 comprises a third link 62 and third, fourth and fifth levers 63, 64 and 65, respectively. Third and fourth levers 63, 64 are journaled for rotation with a second shaft 66 and fifth lever 65 is journaled for rotation with a third shaft 67. Third link 62 is pivotally connected to the radially outer end of signal lever 49 and third lever 63 by pins 68, 69 respectively. Fourth lever 64, journaled for rotation with second shaft 66, has a pin 70 at its free end adapted and positioned for engagement with a curved edge 71 of fifth lever 65. Fifth lever 65, journaled for rotation with third shaft 67, is pivotally connected to control engaging link 57 by pin 72. Biasing means 81 associated with control means 28 urges control engaging link into engagement with the control means valve 73. This tends to cause control engaging link 57 to pivot clockwise about pin 61 which in turn causes fifth lever 65 to pivot clockwise about third shaft 67 to maintain fifth lever 65 in continuous abutting engagement with fourth lever 64.

Referring to FIGS. 1 and 2, it will be apparent that first, second and third shafts 58, 66 and 67 are rotatably supported in bearing structures (not shown) carried by housing 28. First and second shafts 58, 66 have a portion thereof extending outboard to housing 28 for connection with the external motion transmitting linkage; namely, first lever 54 leading from the manual control and third lever 63 transmitting the draft load displacement.

In operation, a change in position of manual control lever 50 on quadrant 51 shifts the fulcrum of control engaging link 57 and limits the engagement of control link 57 with the control means valve 73. As seen in FIG. 2, a roller 74 is rotatably mounted at one end of control link 57 by pin 75 to provide a relatively friction free engaging surface for control link 57.

A change in implement draft load causes a rotational displacement of signal lever 49 in response to the torsional deformation of the draft load sensing means 40. For example, an increase in draft load within the draft load sensing range causes signal lever 49 to be arcuately displaced to the right or clockwise and in turn rotationally displaces fourth lever 64 clockwise about second shaft 66. Fifth lever 65, being continuously urged clockwise about third shaft 67 in abutting engagement with fourth lever 64 by control engaging link 57 follows fourth lever 64 causing roller 74 to displace valve 73 transmitting additional pressure fluid to ram 26 until the weight transferred matches the draft load. A decrease in draft load functions in an opposite manner to relieve the pressure applied to ram 26 until the weight transferred matches the draft load.

In connection with the above described torsion bar or draft sensing means 40, it is desirable to prevent operation of the sensing means 40 under light draft loads and to prevent overstress of the torsion bar beyond safe torsional shear stress when subjected to excessive draft loads.

The former is achieved by applying sufficient preload to the bar; that is, angular "windup" under no load or at rest conditions. As shown in FIG. 2, the preload means comprises a set screw 76, including a jam nut 77 associated with a depending extension of plate 41 and an abutting surface 78 defined on ear 45 adjacent support 43 for abutting engagement with set screw 76. Advancing set screw 76 against surface 78 provides rod 46 with an adjustable "windup" or torsional deformation thereby preselecting a minimum draft load required to actuate or further deform the rod 46. Preloading rod 46 thus avoids unnecessary linkage wear when doing light draft work and preserves all of the linkage travel for more precise positioning of the fluid control 28 in the draft load range where weight transfer is most effective.

To prevent overstressing the bar 46 means are provided to limit the travel of the ear 45 under excessive draft loads. As shown in FIG. 2 the limit means comprise a stop member 79 associated with the second support member 43 and an abutting member 80 defined on lever 45 for engagement with stop member 79. Thus, excessive torsional deformation beyond the operational capabilities of the torsion bar is limited by the abutting member 80 engaging stop member 79.

In general terms, the objects of the herein disclosed invention are achieved by the provision of a tractor body structure having a pair of transversely spaced hitch supporting lugs, such as are represented in the illustrated embodiment of the invention by the supports 42, 43; by the provision of a torsion bar and a tubular member, such as are represented in the illustrated embodiment of the invention by the torsion bar 46 and the tubular member 44; by the provision of a pair of mounting arms for a pair of draft links, such mounting arms being represented in the illustrated embodiment of the invention by the ear members 45; and by the provision of an actuating element for a power lift control mechanism, such actuating element being represented in the illustrated embodiment by the signal lever or lever arm 49. Further, rotation of the tubular member about its axis relative to the tractor may be limited by the provision of a stop element such as is represented in the illustrated embodiment of the invention by the set screw 77 as well as by the stop member 79.

It should be understood that it is not intended to limit the invention to the herein disclosed details of construction, and that the invention includes such other forms and modifications as are embraced by the scope of the appended claim.

Having now particularly described and ascertained the nature of my said invention and the manner in which it is to be performed, I declare that what I claim is:

In a tractor, the combination of a body structure having a pair of transversely spaced hitch supporting members; a torsion bar extending axially through aligned apertures of said members and non-rotatably connected at one of its ends with one of said members; a tubular member rotatably mounted at its axially opposite ends, respectively, in said apertures of said members in surrounding relation to said torsion bar and having an end portion adjacent to the other of said members non-rotatably connected with the other end of said torsion bar; a pair of mounting ears for a pair of draft links non-rotatably secured to said tubular member; an actuating element for a power lift control mechanism connected with said tubular member so as to be swung back and forth about the axis of the latter by back and forth rotation of said tubular member in said members, a pair of stop elements mounted on said tractor in abuttable relation with one of said draft link mounting ears so as to limit rotary displacement of said tubular element relative to said tractor body in opposite directions, and one of said stop elements comprises a screw member threadably mounted on said tractor body for adjustment on an axis extending transversely of said tubular member, said screw member being located forwardly of and below said tubular member, said other stop member being positioned rearwardly of and below said tubular member.

References Cited by the Examiner
UNITED STATES PATENTS

| | | | |
|---|---|---|---|
| 2,705,154 | 3/1955 | Torre | 267—57 X |
| 2,779,604 | 1/1957 | Voegeli | 172—7 |
| 2,782,881 | 2/1957 | Roller | 188—205 X |
| 2,864,121 | 12/1958 | Imber et al. | 267—57 X |
| 2,950,103 | 8/1960 | Ruf | 267—57 |
| 2,974,733 | 3/1961 | Fletcher | 172—7 |
| 3,003,568 | 10/1961 | Merritt et al. | 172—9 |
| 3,022,830 | 2/1962 | Hess | 172—7 |
| 3,022,831 | 2/1962 | Hess | 172—7 |

FOREIGN PATENTS

| | | |
|---|---|---|
| 1,081,263 | 5/1960 | Germany. |

ABRAHAM G. STONE, *Primary Examiner.*

A. JOSEPH GOLDBERG, *Examiner.*